May 25, 1954

H. C. OTIS 2,679,261

PRESSURE RESPONSIVE VALVE

Filed Nov. 17, 1950

Herbert C. Otis
INVENTOR.

BY Browning & Simms
ATTORNEYS

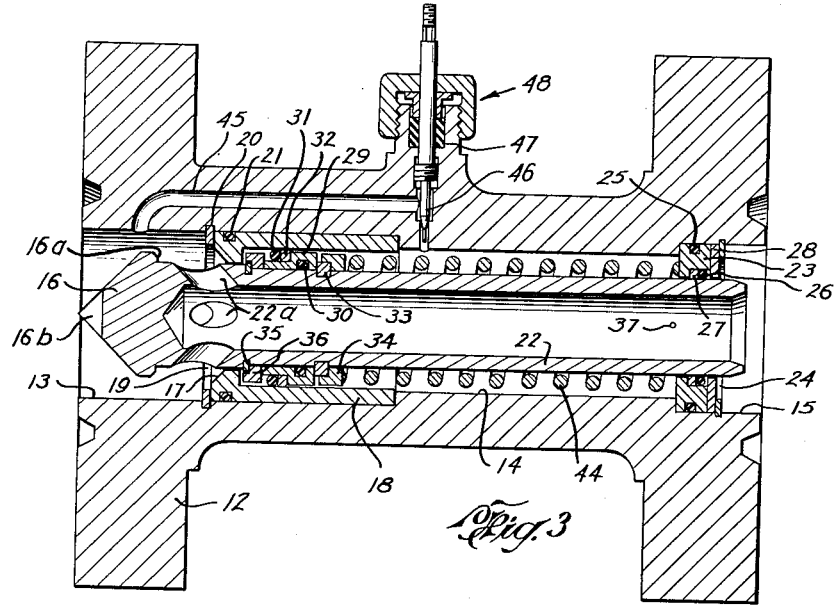
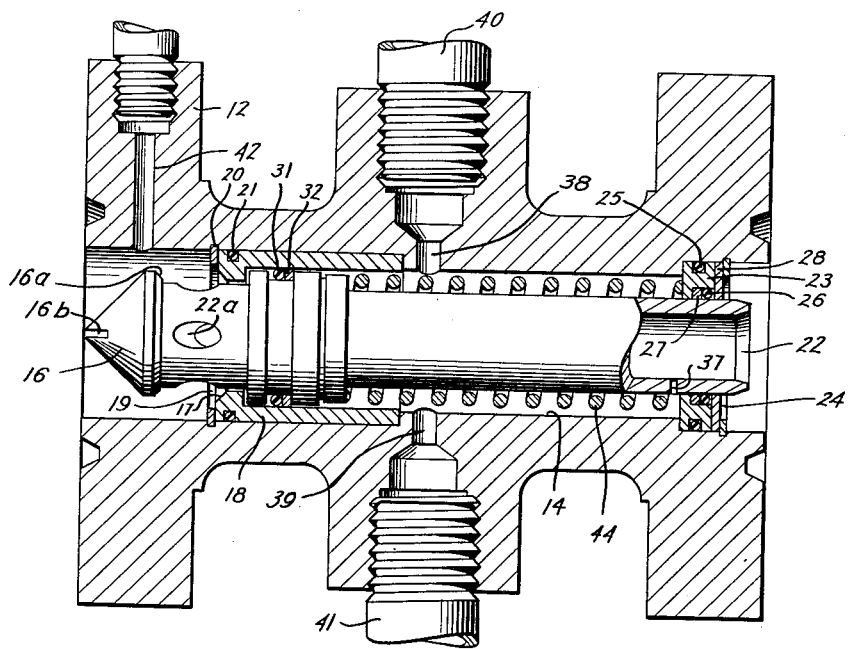

May 25, 1954　　　　　H. C. OTIS　　　　　2,679,261
PRESSURE RESPONSIVE VALVE

Filed Nov. 17, 1950　　　　　　　　　　　　　3 Sheets-Sheet 3

Herbert C. Otis
INVENTOR.

BY
Browning & Simms
ATTORNEYS

Patented May 25, 1954

2,679,261

UNITED STATES PATENT OFFICE 2,679,261

PRESSURE RESPONSIVE VALVE

Herbert C. Otis, Dallas, Tex.

Application November 17, 1950, Serial No. 196,275

22 Claims. (Cl. 137—458)

This invention relates to improvements in pressure responsive valves and refers more particularly to that class of device which serves as a safety control valve to close off a conduit upon occurrence of a predetermined pressure condition within a control pressure.

Safety surface control valves of this type are known to the art such as that shown in my co-pending application for United States Letters Patent, Serial No. 726,373, filed February 4, 1947, for Safety Control Valve, issued United States Letters Patent Number 2,566,772. The safety control devices such as that shown in my co-pending application for patent have been satisfactory in service but are quite expensive when the total cost of the valve and the actuating mechanism is considered together. In installations where full opening valves are required, this type device is entirely satisfactory but in many installations a full opening valve is not a requisite and the present invention provides a much less expensive construction and has for its general object the provision of a safety control device having an integrated valve and actuating mechanism.

An object of this invention is to provide a safety control device in which the valve member and actuating mechanism may be housed within a single body.

A further object is to provide a safety control device of the character described which will close upon occurrence of a predetermined pressure in a control pressure fluid.

Still another object is to provide a pressure responsive valve that will close in response to occurrence of a predetermined pressure within a control pressure fluid and which may be readily opened by the fluid controlled.

A still further object is to provide a pressure responsive valve of the class described which has a minimum number of seals about moving parts.

Even another object is to provide a pressure responsive valve of the character described from which there is no bleed of pressure fluid from the valve to the atmosphere after the valve is closed.

An even further object is to provide a pressure responsive valve which closes quickly allowing only a very small quantity of pressure fluid to pass while the valve is closing.

Yet another object is to provide a pressure responsive valve in which the valve member may be biased toward open position by a resilient element to prevent accidental closing of the valve due to surges within the pressure fluid controlled.

Yet a further object is to provide a pressure responsive valve of the character described of rugged construction which may be economically fabricated and readily installed within a conduit to be controlled.

Other and further objects of the invention will appear as the description proceeds.

In the accompanying drawings forming a part of the instant specification and wherein like reference numerals are used to indicate like parts in the various views:

Fig. 3 is a view taken along the line 3—3 in Fig. 2 in the direction of the arrows;

Fig. 4 is a view taken along the line 4—4 in Fig. 3 in the direction of the arrows;

Figures 1, 2:
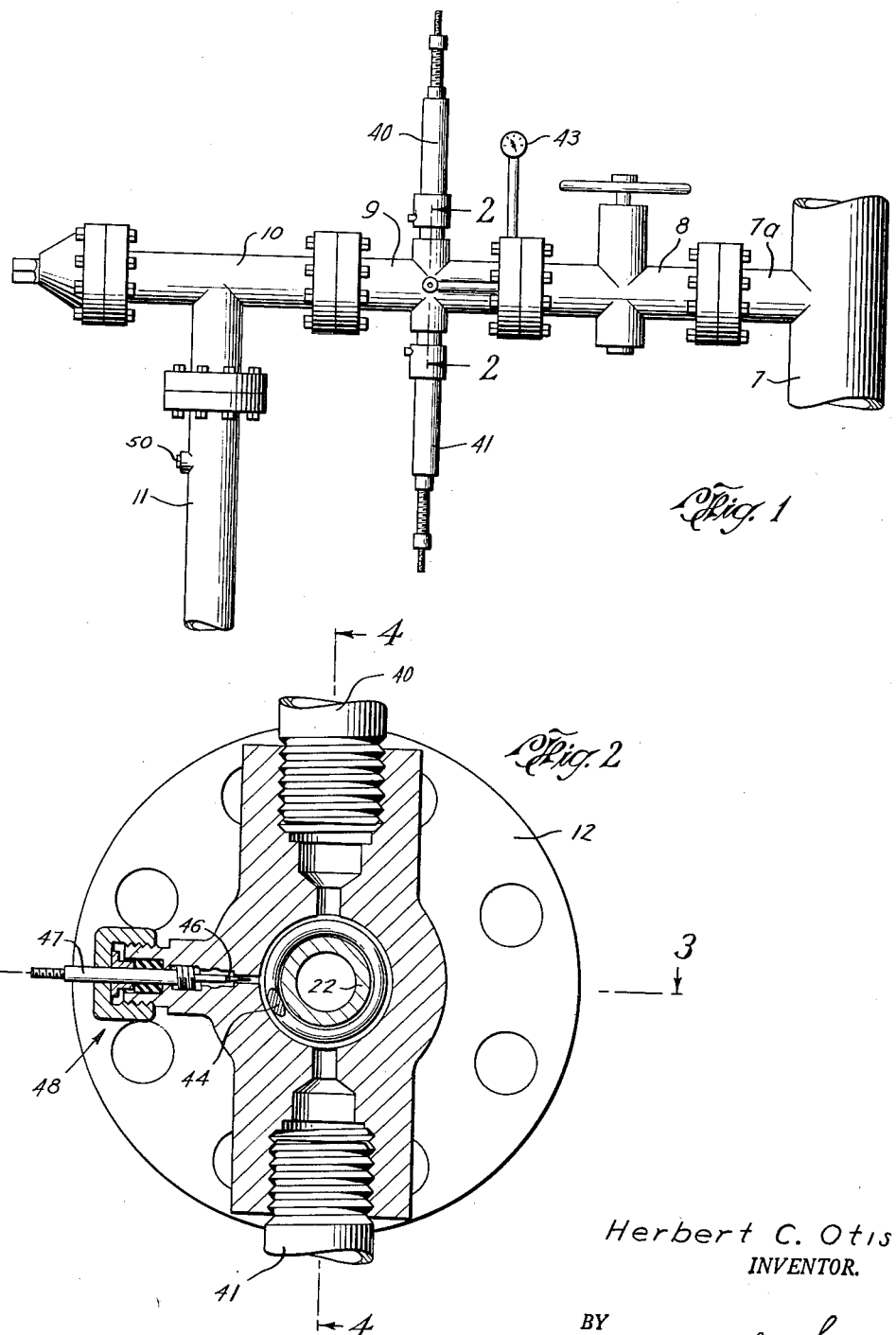
Fig. 1 is a diagrammatic illustration of a well head flow control equipment including a safety device embodying this invention.
Fig. 2 is a view taken along the line 2—2 in Fig. 1 in the direction of the arrows, upon an enlarged scale.

Referring to the diagrammatic illustration of Fig. 1, the numeral 7 may be considered as designating a well head for an oil or gas well. The fitting 7a is a flow line for conducting well fluids from the well and to it is connected the manually operated valve 8. The safety control device or pressure responsive valve of this invention is shown at 9 flanged between the valve 8 and a variable choke 10. A conduit 11 is flanged to the choke 10 and is a part of the fluid gathering system.

The preferred embodiment of the pressure responsive valve of this invention is detailed in Figs. 2, 3 and 4. The valve comprises a valve body 12 having a passage therethrough provided by bores 13, 14 and 15. To control flow through the passage a valve member 16 and seat 17 are provided.

The valve seat 17 is disposed transversely of the passage through the body and may be formed upon a removable seat insert 18. If desirable, this insert may be fabricated of metals having special characteristics such as stainless steel. The insert resides within portion 13 of the body bore and is held against the shoulder between portions 13 and 14 of the bore by a snap ring 19. The snap ring fits into a groove 20 on the internal wall of the body passage. An O-ring 21 seals between the body and seat insert and may reside within a groove formed circumferentially of the periphery of the seat insert.

The valve member 16 has a tapered portion 16a lapped thereon for closely fitting the tapered seat 17. The slot 16b in the nose of the valve member is formed solely for the purpose of facilitating this lapping operation as will be understood by those skilled in the art.

The valve member is connected to a tubular member 22. The tubular member is slidably mounted within the passage through the valve body, and in this embodiment extends through the seat 17. Because of this extension, the tubular member is formed with a plurality of ports 22a for establishing communication between the interior of the tubular member and the left hand side of the valve seat as the device is viewed in Figs. 3 and 4. The tail end of the tubular member, of course, communicates with the passage downstream from the seat and the tubular member.

A seal means is provided between the valve body and the periphery of member 22 which permits sliding movement of the member. This seal means may include a retainer ring 23 held against an internal shoulder at the end of bore 15 by a snap ring 24 which fits an internal groove in bore 15. The retainer ring has a peripheral groove holding O-ring 25 and a groove in its inner periphery which holds an O-ring 26 and a backer ring 27 machined with very close tolerance to the outer periphery of the tubular member 22. This ring 27 may be fabricated of a material having lubricating qualities such as certain plastics as, for example, that sold under the trade-mark "Teflon." A spacer ring 28 may be secured between the retaining ring 23 and the snap ring 24. This ring has an inner opening and serves to retain O-ring 26 within the retainer ring.

It is preferred to polish the outer peripheral surface of that portion of tubular member 22 which extends through the seal means just described. This enables fabrication of the seal retainer ring 23 with closer tolerance than would otherwise be possible.

The tubular member 22 carries a pressure responsive member, which in this embodiment is annular in shape and operates within the inner bore of seat insert 18. The pressure responsive member and the means for securing it on the tubular member may include an O-ring retainer element 29 having an O-ring 30 within an inner peripheral groove and another O-ring 31 about its outer periphery and a backer ring 32 of "Teflon" or the like. Ring 30 provides a stationary seal between element 29 and the tubular member 22 and for this reason, it is not necessary to back up this ring to prevent extrusion because the member 29 may be fabricated with sufficient tolerance to effectively do this because there is no relative movement between the parts. The member 31, however, provides a sliding seal within the seat insert 18, making it much more desirable to utilize a backing ring 32, so as to prevent extrusion of the O-ring between the relatively moving metal parts which might cause it to be damaged.

The retainer element 29 is held against movement to the right as viewed in Fig. 3 by a segmental ring 33 made up of two or more segments which fit in a peripheral groove in the tubular member and are held against radial displacement outwardly by a flanged ring 34. Movement of the retainer ring 29 in the opposite direction may be prevented by a snap ring 35 and a flanged ring 36.

It will be readily apparent that the tubular member 22 together with the pressure responsive member and the seal means carried by the body member and the seal means carried by the body for sealing between the body and the tail of the tubular member provide a pressure chamber. A spring 44 resides in this chamber and has one end abutting against retainer 23 and its other end abuts against flanged ring 34 to hold the latter against segments 33.

Means is provided for supplying pressure fluid to the pressure chamber and in the preferred embodiment an opening 37 constitutes this means. This opening is in the end of tubular member 22 and supplies pressure fluid from the fluid passing through the conduit and body 12 to the pressure chamber. The arrangement of the opening 37 is such that it is ineffective to pressurize the pressure chamber when the valve member is in closed position. This is true because the member 37 will be to the right of seal ring 26 when the valve member is closed. Preferably, the arrangement is such that the hole 37 passes the seal member very quickly upon initial movement of the valve member and tubular member in a closing direction. This arrangement is desirable because it limits to a very small quantity, the amount of fluid that will escape to the pressure chamber and thence to the atmosphere upon closing of the valve.

The opening 37 is a bleed opening or choke opening and it is necessary to provide a means for relieving the pressure within the pressure chamber more rapidly than the pressure may be charged through the bleed opening in order to effect closing of the valve. This means may include one of the ports 38 and 39 and a pressure responsive pilot valve fitted to the port adapted to open upon occurrence of a predetermined pressure condition within the pressure chamber. These pilot valves are shown schematically in the drawings and in the embodiment illustrated two such pilot valves are shown, one at 40 adapted to open upon occurrence of a predetermined low pressure within the chamber, and another at 41 adapted to open upon occurrence of a predetermined high pressure in the chamber. While any suitable pilot valves may be used for this purpose, those shown in my co-pending application, Serial No. 726,373, filed Febraury 4, 1947, for "Safety Control Valve" are preferred because each of them are arranged to open very quickly with a snap action upon the occurrence of the particular pressure at which they are to open. In the co-pending application, the low pressure pilot relief valve is designated generally at A and a high pressure pilot relief valve is designated generally at B, both in Fig. 1. For the details of construction of these valves, reference is hereby made to said co-pending application and these details are omitted from this drawing and specification in the interest of simplicity.

In the embodiment illustrated in Figs. 3 and 4, a means for opening a valve is shown. The port 42 drilled in the flange of the valve body may receive a pressure gauge 43 which the operator may observe to be certain the valve opens, for upon opening of the valve the pressure will drop somewhat. The pilot valves preferably are of the type that require manual closing and are, of course, first closed before the main valve of the safety device is opened.

The means provided for opening the valve is pressure actuated, but is novel in that it does not require any fluid to be exhausted to the atmosphere. The importance of this will be readily appreciated when highly inflammable and explosive fluids are transported by the conduit controlled, such as gas, oil, and the like.

The opening means includes a passage or port 45 and a valve 46 controlling the passage. The passage communicates between the pressure chamber and the main passage through the body at a point upstream of the valve seat so that when the valve 46 is open pressure fluid will be supplied through it to the pressure chamber. The valve is mounted upon a stem 47 threaded in a bore within the body and extending exteriorly of the body through a stuffing box arrangement shown generally at 48. When the valve is acting as a safety device the valve element 46 is seated. When it is desired to open the valve member 16, the pilot valves 40 and 41 are checked to be sure that they are both closed and if one is open, it is closed. Then the valve 46 is opened to admit pressure fluid to the pressure chamber. The effective face of the pressure responsive member which is exposed to the pressure chamber surrounding tubular member 22 is designed to have a greater area than the sum of the areas across the valve seat 17 and the seal provided by O-ring 26 on the periphery of the tubular member 22. With this arrangement of the particular areas involved, the upstream pressure which is now effective within the pressure chamber will provide a resultant force urging the tubular member toward open position which will be as great as or greater than the sum of the forces acting against the tubular member and valve member tending to urge them in the opposite direction. Even though the forces are balanced, as may occur under some pressure conditions, then the spring 44 will cause the valve member to open but normally the forces will not be balanced and there will be a resultant force which will urge the tubular member toward open position. Examples illustrating the manner in which these forces develop tending to open the valve member are given below:

*Example 1*

Where:

$A$=area across valve seat with valve member seated.
$B$=total area across pressure responsive member.
$C$=total area of right hand end of tubular member 22 at its sliding seal with the valve member closed.

The following force formula may be considered:

$$Up\ A + Dp\ (B-A) \rightarrow \leftarrow Up\ (B-C) + Dp\ C$$

Where:

$Up$ is upstream pressure.
$Dp$ is downstream pressure.

Now if:

$Up$=1100 p. s. i.
$Dp$=1000 p. s. i.
$A$=1.5 sq. in.
$B$=3.5 sq. in.
$C$=1 sq. in.

Then:

$$1100 \times 1.5 + 1000 \times 2 \rightarrow \leftarrow 1100 \times 2.5 + 1000$$

Or:

$$1650 + 2000 \rightarrow \leftarrow 2750 + 1000$$

Or:

$$3650 \rightarrow \leftarrow 3750$$

Thus, with the above arrangement there would be a resultant force of 100 pounds urging the valve member and tubular member toward open position in addition to the force of spring 44. Now, assuming a situation where both the upstream and downstream pressures both equal 1100, as would be the case where the downstream line is plugged up by hydrates or the like but the dimensions would be the same as in the first example, then we have Example 2:

$$1100 \times 1.5 + 1100 \times 2 \rightarrow \leftarrow 1100 \times 2.5 + 1100 \times 1$$

Or:

$$1650 + 2200 = 3850 \rightarrow \leftarrow 3850 = 2750 + 1100$$

With conditions as in Example 2, then the spring 44 is relied upon to provide the resultant force tending to open the valve member.

*Example 3.*—This example will illustrate the necessity of having the pressure responsive member with an area relative to the area across the valve seat and the area across the seal at the tail of the tubular member as outlined above unless a very strong spring is to be employed. The pressure condition will be considered to be the same as in Example 1, but the areas A, B and C are as follows:

$$A=1.5$$
$$B=2$$
$$C=1$$

Then:

$$1100 \times 1.5 + .5 \times 1000 \rightarrow \leftarrow 1100 \times 1 + 1000 \times 1$$

Or:

$$1650 + 500 \rightarrow \leftarrow 1100 + 1000$$

Or:

$$2150 \rightarrow \leftarrow 2100$$

It will be seen that the spring 44 will have to be sufficiently large to actually provide an opening force to overcome a resultant force which would tend to keep the valve member closed. While such an arrangement is possible, it is not feasible where the pressure responsive member is to be employed under varying flow conditions. It is much more desirable to arrange the effective areas of the pressure responsive member, the valve member and seat, and the seal across the tail of the tubular member so that the resultant pressures will at least always balance out and then only a spring under about 50 pounds compression need be employed. The purpose of such a spring is to reduce the likelihood of accidental closing of the valve member due to surges in line pressure, so that the valve will close only when one of the pilot valves relieves the pressure within the pressure chamber.

It is believed that the operation of the pressure responsive valve shown in the first four figures is apparent from the foregoing disclosure. However, the operation will be briefly discussed with it assumed that the pressure responsive valve is connected in a system as shown in Fig. 1. It will be assumed that the valve 8 is open and that well fluids are flowing from the well head through the installation into a gathering system as shown by conduit 11. Pilot valves 40 and 41 are both closed. Under this condition, the pressure upstream of the valve member 16 will be slightly greater than the pressure downstream and at the opening 37. Thus, the pressure within the pressure chamber will be somewhat less than the upstream pressure, but normally this pressure drop will not be very material. The pressure within the pressure chamber acts against the pressure responsive member, along with the spring 44, to hold the valve member in open position. In the event of a surge in pressure within the line, the spring 44 will maintain the valve open and the spring is fabricated to be sufficiently stiff so as to serve in this manner under the operating conditions that are to be encountered within the particular line to be controlled.

Upon occurrence of a predetermined low pressure, the low pressure one of the pilot valves 40 and 41 will open and inasmuch as the ports controlled by the pilot valves are larger than the opening 37, the pressure within the pressure chamber will quickly be relieved and the upstream pressure acting against the opposite face of the pressure responsive member will cause the tubular member 22 and the valve member 16 to move to the right as shown in Figs. 3 and 4, until the valve member seats at 17. Usually a low pressure condition will occur only because of a break or some similar mishap downstream so that the pressure downstream of the valve member will probably bleed down to substantially atmosphere. However, just as soon as the valve member is completely seated, the escape of pressure fluid from the pressure chamber quickly stops because the opening 37 has been moved downstream of the seal provided by O-ring 26.

The occurrence of a predetermined high pressure within the line controlled will cause the high pressure one of the pilot valves to open. This will relieve the pressure within the pressure chamber to effect closing of the safety device.

When it is desired to reopen the safety device, the pilot valve, which is open, is first closed and then the pressure responsive valve may be opened.

It will be recalled from a description of the pressure responsive valve that the means for opening the valve includes the valve 46 which controls the passage 45 and by opening the valve 46, after first closing the pilot valve 40 or 41, whichever might be open, that the pressure from upstream of valve member 16 will be supplied to the pressure chamber and acts against the pressure responsive member to open the valve. After the valve is opened, then the valve 46 is reseated to close the passage 45 and the pressure responsive valve will continue to function as a safety control device.

Figure 5:
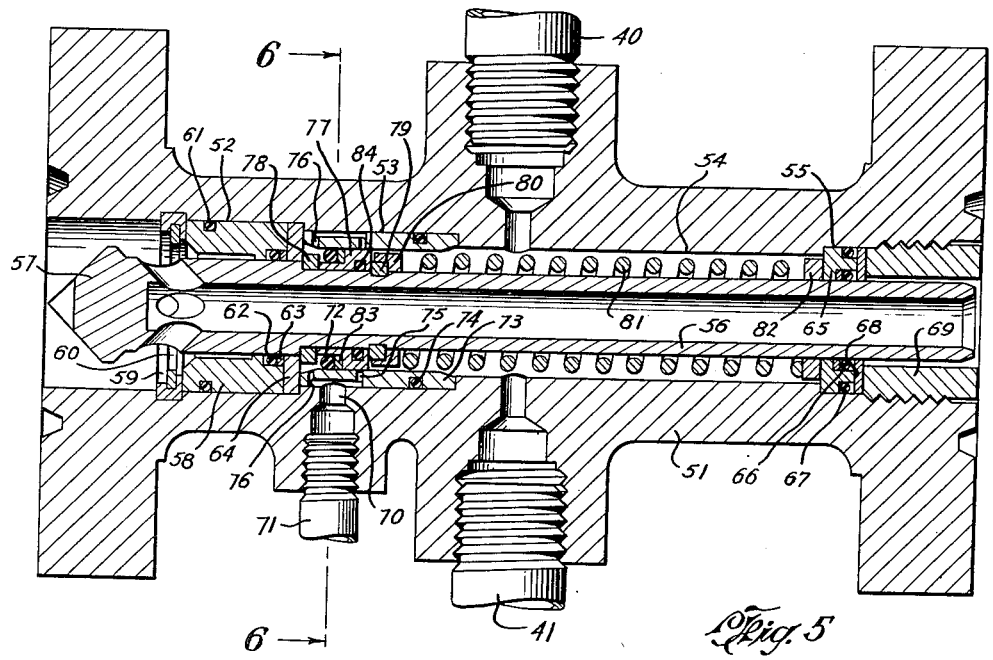
Fig. 5 is a cross-sectional view of a modified pressure responsive valve embodying this invention.
Figure 6:
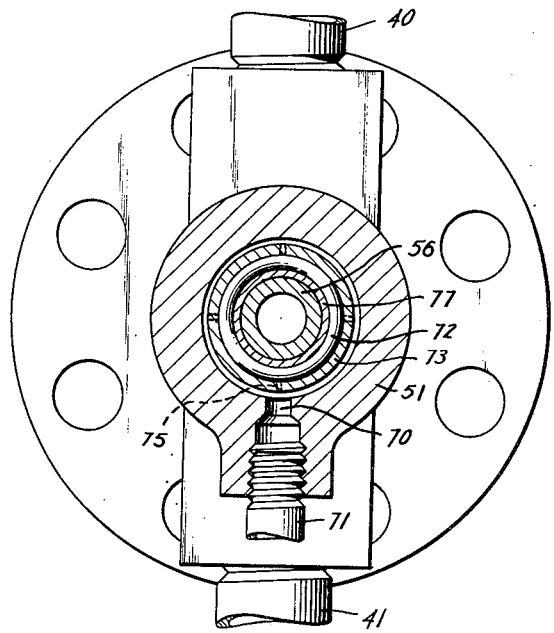
Fig. 6 is a view taken along the line 6—6 in Fig. 5 in the direction of the arrows.

The modification of Figs. 5 and 6 is a very similar to that shown in the preceding figures but is especially designed so that a control fluid may be utilized to pressurize the pressure chamber of the pressure responsive valve, other than the fluid pressure which is passing through the valve. In many well installations, it is very desirable to utilize the pressure downstream from the choke, as shown at 10 in Fig. 1, as a control pressure rather than the pressure of the fluid upstream of the choke. Nevertheless, it is desirable to have the safety device located upstream of the choke because the line fittings downstream of the choke seldom are sufficiently heavy to withstand the upstream pressure in the event the safety device closes. Of course, when the device closes, all the fittings upstream of the device would be eventually subjected to the maximum pressure upstream of the choke.

The primary reason for wanting to control the safety device in response to the pressure downstream from the choke is that the device will be much more sensitive when arranged in this manner. It is believed readily apparent that the pressure downstream from the choke 10 will more quickly reflect or respond to a condition within the conduit, such as a plugging up of the conduit or break in the conduit, than would the pressure upstream of the choke 10.

While it would be possible to modify the Figs. 3 and 4 embodiment by closing off the port 37 and tapping a port in the body wall, to be connected to a source of control pressure fluid such as the fitting 50 on the conduit 11, such an arrangement would permit bleeding of the control fluid through the open pilot valve in the event the pressure responsive valve closes. However, in the modification shown in Figs. 5 and 6, the means for pressurizing the pressure chamber of the valve is such that when the valve closes the means is ineffective to pressurize the chamber, thus preventing undue loss of the pressure fluid to the atmosphere.

The valve body 51 has a passage therethrough with bores 52, 53, 54 and 55, all being of different diameters. The tubular member 56 carries the valve member 57 and extends through a seat insert 58 held in bore 52 by a plurality of at least 3 ring segments 59 held together by a snap ring 60. The seat insert has an O-ring seal 61 in bore 52 and a sliding seal 62 with the periphery of the tubular member 56. A close fitting plastic backer 63 prevents extrusion of the O-ring and a spacer 64 holds the backer ring in place. At the tail of the tubular member is an O-ring retainer 65 having O-rings 66 and 67 for sealing between the body and the tubular member. A washer 68 holds the O-ring retainer against an internal shoulder at the end of bore 55 and in turn is held in position by a threaded bushing nut 69.

The pilot valves 40 and 41 communicate with the pressure chamber provided by the space between the tubular member and valve body and may be the same as those shown in the preceding modification.

The means for supplying a pressure fluid to the interior of the pressure chamber includes the port 70 and conduit 71 adapted to communicate between the port and the fitting 50 on the conduit 11 as shown in Fig. 1.

This port 70 is adapted to communicate with the interior of the chamber, when the valve member 57 is opened, on both sides of a seal 72, but when the valve member 57 is closed, the seal 72 serves to seal off the port 70 from the portion of the pressure chamber with which the pilot valves communicate. Thus, when the pressure responsive valve is closed, only a very small quantity of pressure fluid will be discharged from the valve body.

The preferred means for accomplishing this includes a bushing 73 having an O-ring seal 74 with the portion 53 of the body bore. This bushing has a peripheral groove which communicates with the port 70. This groove has a plurality of openings 75 and 76. The openings 75 are arranged circumferentially of the bushing in a plane normal to the axis of the bushing and this is true also of the openings 76, but the two planes are spaced somewhat apart so that with the valve member in full open position the seal element 72 resides between the two sets of ports. However, when the valve member is closed, the seal 72 moves to the right, as viewed in Fig. 5, so that both sets of ports 75 and 76 are upon one side of the seal and the seal separates that portion of the chamber with which the pilot valves communicate from the port 70.

The seal ring 72 may be mounted upon the tubular member by securing an O-ring retainer ring 77 about the periphery of the tubular member between washer 78 and ring segment 79 held against outward radial displacement by a flanged washer 80. The washer is urged against the segment 79 by the spring 81 which surrounds tubular member 56 and extends from the washer 80 to a washer 82 abutting against O-ring retainer ring 65.

The O-ring retainer 77 carries on its outer periphery the O-ring 72 and preferably a plastic backer ring 83. Also, the retainer ring 77 carries an O-ring 84 which seals between the retainer ring and the outer periphery of the tubular member.

The modification of Figs. 5 and 6 may be supplied with an opening means of either type shown in the other modification and in the interest of simplicity a further discussion of this will be dispensed with.

It is felt that the operation of the modification will be readily appreciated from the foregoing description. The valve is assembled in the installation in place of the safety responsive device 9, as shown in Fig. 1.

The conduit 71 is connected between tap 70 in the valve body and the fitting 50 on conduit 11. The pilot valves 40 and 41 are set to open at predetermined low and high pressures respectively and the valve 8 is opened. With this arrangement, the pressure chamber is entirely sealed off from the valve passage and the pressure to the chamber is supplied from downstream of the choke 10 through fitting 50, conduit 71, and port 70. The pressure enters the pressure chamber on both sides of the O-ring 72 so that the effective pressure responsive member is the O-ring 62 which on one side is subjected to upstream pressure and upon the other side is subjected to pressure within the pressure chamber.

When either of the pilots 40 or 41 open, the pressure within the pressure chamber is quickly bled down because the ports controlled by the pilot valves are of greater cross-sectional area than the sum of the openings 75. When this occurs, the pressure upstream of O-ring 62 acts against that area to close the valve and the pilot pressure acting against the left hand side of O-ring 72, as viewed in Fig. 5, also tends to close the valve. However, as soon as the valve movement has progressed sufficiently for the O-ring 72 to have cleared the port 75, then this O-ring and O-ring 84 effectively seal off the pilot valves from port 70 to prevent further loss of the control fluid.

From the foregoing, it is clear that the ends and objects of this invention have been accomplished. There has been provided a very rugged and compact pressure responsive valve, all residing within a single body which may be closed automatically upon occurrence of a predetermined pressure within a control pressure fluid. This pressure fluid may be either the fluid controlled or any other outside source of pressure fluid. A resilient element is provided to reduce the likelihood of accidental closing of the valve upon surging of line fluid controlled so that the valve operates more positively to close only upon opening of one of the pilot valves. The construction is such that the pressure of the fluid controlled may be utilized to open the valve and this pressure is utilized to close the valve. The arrangement is such that the valve and actuating mechanism are integrated into a single unit that may be inexpensively fabricated and installed in a pressure system.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pressure responsive valve comprising a valve body with a passage therethrough; a valve seat disposed transversely of the passage; a valve member within the passage upstream of the seat and cooperable with the seat to control the passage; means downstream of the seat, including a pressure responsive member, providing a pressure chamber within the body and encircling the passage; an actuating connection between the pressure responsive member and the valve member, said connection providing in part the passage through the valve body, the arrangement being such that the pressure within the chamber acts against the pressure responsive member to urge it in a direction to open the valve member and the pressure of the fluid controlled acts against the pressure responsive member to urge it in the opposite direction when the valve member is in open position; a bleed opening communicating between the chamber and passage when the valve member is in open position; a vent port of large capacity relative to the bleed; a pilot valve controlling the vent port and adapted to open the port upon occurrence of a predetermined pressure within the chamber.

2. A pressure responsive valve comprising a body with a passage therethrough, a valve seat disposed transversely of the passage, a valve member within the passage and cooperable with the seat to control the passage, a tubular member connected to the valve member and slidably mounted within the passage within limits and extending through the valve seat, the tubular member having an opening which in one position of the tubular and valve members establishes communication between the passage on each side of the seat but which resides downstream of the seat when the valve member is seated, the tubular member and the body wall which forms the passage providing a chamber therebetween, seal means between the body and tubular member at the ends of the chamber to seal it off, a bleed opening on the tubular member adapted to communicate with the chamber when the valve member is in open position, a port in the body of large cross-sectional area as compared with the bleed opening, and a pilot relief valve controlling the port adapted to open in response to occurrence of a predetermined pressure within the chamber.

3. A pressure responsive valve comprising a valve body with a passage therethrough; a movable valve member and a seat in the passage controlling it; means, including a pressure responsive member encircling the passage and connected to the valve member for movement therewith, providing a sealed off pressure chamber within the body, the pressure responsive member having one face exposed to the pressure chamber and an opposing face exposed to the interior of the passage, when the valve member is in open position, whereby the pressure within the passage urges the pressure responsive member in a direction to seat the valve member; choke means for supplying pressure fluid to the chamber when the valve member is in open position; and pressure responsive means for relieving the pressure within the chamber upon occurrence of a predetermined pressure within the chamber.

4. The arrangement of claim 3 wherein means is provided to render the choke means ineffective to supply pressure fluid to the chamber when the valve member is seated.

5. The arrangement of claim 3 wherein a spring urges the valve member toward open position.

6. The arrangement of claim 3 wherein the pressure responsive member is a piston slidably mounted within the passage.

7. A pressure responsive valve comprising a valve body with a passage therethrough; a seat disposed transversely of the passage; a tubular member slidably mounted in the passage; a valve member connected to the tubular member for movement therewith and cooperable with the seat to control the passage; an annular pressure responsive member carried by the tubular member and having a sliding seal interiorly of the body passage; seal means spaced from the pressure responsive member and carried by the body to provide a sliding seal between the body and tubular member; the body, the tubular member, the pressure responsive member and the seal means providing a sealed chamber within the body; a choke means communicating with the chamber for pressurizing it; and an opening in the body communicating with the chamber and formed to receive a relief valve.

8. The valve of claim 7 wherein the choke means is an opening in the tubular member.

9. The valve of claim 7 wherein the choke means includes an opening in the body adapted to receive a pressure fluid supply conduit.

10. A pressure responsive valve comprising a valve body with a passage therethrough, a seat disposed transversely of the passage; a tubular member slidably mounted in the passage; a valve member connected to the tubular member for movement therewith and cooperable with the seat to control the passage; an annular pressure responsive member carried by the tubular member and having a sliding seal interiorly of the body; seal means spaced from the pressure responsive member and carried by the body to provide a sliding seal between the body and tubular member; the body, the tubular member, the pressure responsive member and the seal means providing a chamber within the body; choke means for supplying pressure fluid to the chamber when the valve member is open, said choke means being ineffective to supply pressure fluid to the chamber when the valve member is seated; and a port for relieving pressure within the chamber.

11. The valve of claim 10 wherein the choke means includes an opening in the tubular member located to occupy different positions on different sides of the seal means with the valve member in fully opened and seated positions.

12. The valve of claim 11 wherein the choke opening is located so as to become ineffective upon slight movement of the tubular member in a direction to move the valve member from full open position toward seated position.

13. The valve of claim 10 wherein the choke means includes an opening in the valve body adapted to receive a pressure fluid supply conduit.

14. The valve of claim 10 wherein the choke means includes an opening in the valve body adapted to receive a pressure fluid supply conduit, two choke openings spaced apart along the longitudinal axis of the passage, the choke openings communicating between said latter opening and the chamber, and seal means carried by the tubular member located to reside between the choke openings with the valve member in full open position and to separate the choke openings from the body port for relieving pressure within the chamber when the valve member is seated.

15. A pressure responsive valve comprising a valve body with a passage therethrough; a seat disposed transversely of the passage; a tubular member slidably mounted in the passage; a valve member connected to the tubular member for movement therewith and cooperable with the seat to control the passage; an annular pressure responsive member carried by the tubular member and having a sliding seal interiorly of the body and downstream of the seat; seal means spaced from the pressure responsive member and carried by the body to provide a sliding seal between the body and tubular member; the body, the tubular member, the pressure responsive member and the seal means providing a chamber within the body; a choke means communicating with the chamber for pressurizing it; an opening in the body communicating with the chamber for venting same and formed to receive a relief valve, a spring within the body effective to urge the valve member toward open position and port means for selectively supplying fluid to be controlled to the chamber when the valve member is seated.

16. A pressure responsive valve comprising a valve body with a passage therethrough; a seat disposed transversely of the passage; a tubular member slidably mounted in the passage; a valve member connected to the tubular member for movement therewith and cooperable with the seat to control the passage; an annular pressure responsive member carried by the tubular member and having a sliding seal interiorly of the body and downstream of the seat; seal means spaced from the pressure responsive member and carried by the body to provide a sliding seal between the body and the tubular member; the body, the tubular member, the pressure responsive member and the seal means providing a chamber within the body; a choke means communicating with the chamber for pressurizing it; an opening in the body communicating with the chamber and means for selectively supplying fluid to be controlled to the chamber whereby the chamber may be pressurized when the valve member is seated to open the valve; the area of the pressure responsive member being greater than the sum of the areas of the seat and of the tubular member at the seal means carried by the body.

17. The valve of claim 16 wherein a spring in the body is effective to urge the valve member toward open position.

18. In a valve a body with a passage therethrough, a valve member and seat controlling the passage, a tubular member connected with the valve member, the tubular member carrying a pressure responsive member downstream from the seat, the interior of the tubular member forming a part of the flow passage, seal means providing a sliding seal between the body passage and a small diameter portion of the tubular member, restricted means for supplying pressure fluid to the space between the pressure responsive member and seal means, and means for relieving the pressure within such space upon occurrence of a predetermined pressure.

19. In a valve a body with a passage therethrough, a valve member and seat controlling the passage, a tubular member connected with the valve member, the tubular member carrying a pressure responsive member downstream from the seat, the interior of the tubular member forming a part of the flow passage, seal means providing a sliding seal between the body passage and a small diameter portion of the tubular member, restricted means for supplying pressure fluid to the space between the pressure responsive member and seal means, and means for relieving the pressure within such space upon occurrence of a predetermined pressure, said pressure responsive member having a greater area than the sum of the areas across the seat and the seal means.

20. A subcombination adaptable for use in conjunction with a pressure responsive valve, the subcombination comprising a valve body with an opening extending therethrough; a liner with an inner cylindrical surface, the liner sealingly secured in the body opening, a seat formed upon the liner; a tubular member in the body opening and slidingly extending through the liner, a valve member connected to the tubular member for movement therewith and cooperable with the seat to control the passage, an annular piston carried by the tubular member and having a sliding seal with the cylindrical surface of the liner; and seal means providing a sliding seal between the body and tubular member remote from the piston, seat and valve member; the body, the liner, the tubular member, the piston and the seal means providing a chamber within the body; the body formed with an opening communicating with the chamber for venting same; the tubular member formed with a flow passage therethrough extending from the side of the seat remote from the piston and past the chamber when the tubular member is in position with the valve member unseated, said flow passage constituting a part of the main flow passage through the device.

21. A pressure responsive valve comprising a body with a passage therethrough, a valve seat disposed transversely of the passage, a valve member within the passage and cooperable with the seat to control the passage, a tubular member connected to the valve member and slidably mounted within the passage within limits and extending through the valve seat, the tubular member having an opening which in one position of the tubular and valve members establishes communication between the passage on each side of the seat but which resides downstream of the seat when the valve member is seated, the tubular member and the body wall which forms the passage providing a chamber therebetween, choke means adapted to communicate with the chamber when the valve member is in open position, a port in the body of large cross-sectional area as compared with the choke means, and a pilot relief valve controlling the port adapted to open in response to occurrence of a predetermined pressure within the chamber.

22. A pressure responsive valve comprising a valve body with a passage therethrough; a movable valve member and a seat in the passage controlling it; means downstream of the seat, including a pressure responsive member encircling the passage and connected to the valve member for movement therewith, providing a sealed off pressure chamber within the body, the pressure responsive member having one face exposed to the pressure chamber and an opposing face exposed to the interior of the passage, when the valve member is in open position, whereby the pressure within the passage urges the pressure responsive member in a direction to seat the valve member; choke means for supplying pressure fluid to the chamber when the valve member is in open position; pressure responsive means for relieving the pressure within the chamber upon occurrence of a predetermined pressure within the chamber, spring means urging the valve member toward open position and means to selectively admit pressure fluid to the chamber when the valve member is seated to facilitate opening of the valve.

References Cited in the file of this patent

UNITED STATES PATENTS

| Number | Name | Date |
|---|---|---|
| 901,222 | Anderson | Oct. 13, 1908 |
| 1,319,154 | Johnson | Oct. 21, 1919 |
| 2,043,453 | Vickers | June 9, 1936 |
| 2,418,743 | Baker | Apr. 8, 1947 |
| 2,512,190 | Waterman | June 20, 1950 |
| 2,543,566 | Brown | Feb. 27, 1951 |
| 2,554,390 | Stevenson | May 22, 1951 |
| 2,583,295 | Greer et al. | Jan. 22, 1952 |

FOREIGN PATENTS

| Number | Country | Date |
|---|---|---|
| 868,263 | France | Dec. 22, 1941 |
| 723,307 | Germany | Aug. 1, 1942 |